United States Patent [19]
Wei

[11] Patent Number: 5,301,209
[45] Date of Patent: Apr. 5, 1994

[54] MULTIDIMENSIONAL TRELLIS-CODED MODULATION FOR FADING CHANNELS

[75] Inventor: Lee-Fang Wei, Lincroft, N.J.

[73] Assignee: AT&T Bell Laboratories, Murray Hill, N.J.

[21] Appl. No.: 773,828

[22] Filed: Oct. 9, 1991

[51] Int. Cl.[5] .................. H04L 5/12; H04L 23/02
[52] U.S. Cl. ................................ 375/39; 375/94; 371/43
[58] Field of Search ............... 375/27, 38, 53, 99, 375/39, 40, 49, 95, 96; 371/43, 44

[56] References Cited

U.S. PATENT DOCUMENTS

| | | | |
|---|---|---|---|
| 4,945,549 | 7/1990 | Simon et al. | 375/53 |
| 4,980,897 | 12/1990 | Decker et al. | 375/38 |
| 5,029,185 | 7/1991 | Wei | 375/27 |
| 5,048,057 | 9/1991 | Saleh et al. | 375/99 X |
| 5,056,112 | 10/1991 | Wei | 375/53 |
| 5,088,113 | 2/1992 | Wei | 375/53 |

OTHER PUBLICATIONS

L-F. Wei, "Trellis-coded modulation with multidimensional constellations," *IEEE Trans. Inform. Theory*, vol. IT-33, pp. 483–501. Jul. 1987.

G. Ungerboeck, "Trellis-coded modulation with redundant signal sets, Part I: Introduction & Part II: State of the art," *IEEE Commun. Magazine*, vol. 25, pp. 5–21, Feb. 1987.

D. Divsalar and M. K. Simon, "The design of trellis coded MPSK for fading channels: Performance criteria & Set partitioning for optimum code design," *IEEE Trans. Commun.* vol. COM-36, pp. 1004–1022, Sep. 1988.

P. J. McLane et al., "PSK and DPSK trellis codes for fast fading, shadowed mobile satellite communication channels," *IEEE Trans. Commun.*, vol. COM-36, pp. 1242–1246, Nov. 1988.

C. Schlegel and D. J. Costello, Jr., "Bandwidth efficient coding for fading channels: code construction and performance analysis," *IEEE J. Select. Areas Commun.*, vol. SAC-7, pp. 1356–1368, Dec. 1989.

*Primary Examiner*—Stephen Chin
*Assistant Examiner*—Bryan Webster
*Attorney, Agent, or Firm*—Joseph J. Opalach

[57] ABSTRACT

The decoding depth of a multidimensional trellis-coding scheme with X-fold time diversity is reduced, or minimized. As a result, an improvement in error rate performance is achieved for the multidimensional trellis code, which can then be favorably applied to a fading channel application.

18 Claims, 5 Drawing Sheets

6-PSK

8-PSK

FIG. 4   8-SUBSET PARTITION OF 32-POINT 4-DIMENSIONAL 8-PSK

TRELLIS DIAGRAM OF 4-DIMENSIONAL 4-STATE
TRELLIS-CODED 8-PSK

4-DIMENSIONAL 4-STATE TRELLIS-CODED 8-PSK WITH 2 BITS/SYMBOL

2T : DELAY ELEMENT
T : SIGNALING INTERVAL
⊕ : EXCLUSIVE OR

FIG. 7  8-SUBSET PARTITION OF 24-POINT 4-DIMENSIONAL 6-PSK

4-DIMENSIONAL 4-STATE TRELLIS-CODED 6-PSK

FRACTIONAL-BIT ENCODER

| INPUT BIT PATTERN* | | | OUTPUT BIT PATTERN* | | | |
|---|---|---|---|---|---|---|
| | | | (LEAD 20) | | (LEAD 22) | |
| 0 | 0 | 0 | 0 | 0 | 0 | 0 |
| 0 | 0 | 1 | 0 | 0 | 0 | 1 |
| 0 | 1 | 0 | 0 | 1 | 0 | 0 |
| 0 | 1 | 1 | 0 | 1 | 0 | 1 |
| 1 | 0 | 0 | 1 | 0 | 0 | 0 |
| 1 | 0 | 1 | 1 | 0 | 0 | 1 |
| 1 | 1 | 0 | 0 | 0 | 1 | 0 |
| 1 | 1 | 1 | 0 | 1 | 1 | 0 |

*READING FROM TOP TO BOTTOM IN FIG. 8

MULTIDIMENSIONAL TRELLIS-CODED MODULATION FOR FADING CHANNELS

BACKGROUND OF THE INVENTION

The present invention relates to trellis-coded modulation techniques and, more particularly, the use of these techniques in fading channel applications, e.g., in cellular mobile radio.

For communications systems that contain AWGN channels, i.e., channels that are characterized by additive white Gaussian noise (AWGN), trellis-coded modulation methods have been found to provide a "coding gain" in signal power (compared to so-called "uncoded" modulation methods) with the result of improving the error performance of the system without requiring additional bandwidth. For example, trellis-coded modulation has proved to be a practical power-efficient and bandwidth-efficient modulation method for use in commercial telephone-line modems, i.e., data communications, and has resulted in an increase of line rates of those modems to as much as 19.2 Kbits/sec.

Trellis-coded modulation can be classified into two categories: two-dimensional (2 D) trellis-coded modulation and multidimensional trellis-coded modulation. Those working in the prior art have shown that when applied to an AWGN channel multidimensional trellis-coded modulation has many advantages over 2 D trellis-coded modulation. These advantages are higher coding gains, lower decoder complexities, and smaller constituent 2 D constellations.

Besides the use of trellis-coded modulation in AWGN channels, those in the art have been investigating the applicability of trellis-coded modulation to communications systems that contain "fading" channels, i.e., channels in which the received signal could be too weak to carry any useful information (a phenomenon called "deep fade"). An important example of fading channels is that of cellular mobile radio. In cellular mobile radio, the received signal can change from being very weak to very strong, and vice versa, within only a foot of driving distance (or a few tens of milliseconds at a vehicle speed of 20 miles/hour).

To apply trellis-coded modulation to fading channels, the code should exhibit a so-called "time diversity" property so that the transmitted information may still be recovered in the receiver even in the presence of deep fade. A code is said to have "X-fold" ($X \leq 2$) time diversity if any pair of valid sequences of signal points of the code differ in at least X signal point positions in the sequence. Conceptually, this time diversity is manifested by an interdependence between the signal points that are produced by the coded modulation scheme. For example, consider the case where two 2 D signal points are produced over a time interval and there is a time-diverse interdependence between these points. As a result of this interdependence, the input data represented by the two 2 D signal points may be able to be accurately recovered even if one of the 2 D signal points is lost. To effectively use the time-diversity property of a code to cope with deep fade, which tends to be bursty, an interleaver is often used to further separate the time intervals in which the signal points that contribute to the diversity of the code are transmitted. The farther these time intervals are spaced, the better the error-rate performance of the coded system is. Generally speaking, for a given interleaver length, which is limited by the total amount of transmission delay that can be tolerated, the shorter the decoding depth (to be described below) of a code is, the farther the signal points that contribute to the X-fold time diversity of the code can be separated and the better the error-rate performance of the code is. Unfortunately, a multidimensional trellis code typically has a longer decoding depth than a 2 D trellis code and, hence, a poorer error-rate performance than a 2 D trellis code when applied to a fading channel.

In consideration of the above, it would be advantageous to minimize the decoding depth of a multidimensional trellis code with X-fold time diversity for application to a fading channel.

SUMMARY OF THE INVENTION

In the prior art, in the design of a multidimensional trellis-coded modulation scheme, a multidimensional constellation of signal points is partitioned into a first and a second family, with each family comprising a plurality of subsets. Each subset, in turn, comprises a plurality of multidimensional signal points. The families and subsets are chosen so that the intra-family and intra-subset minimum built-in time diversity (MTD) and minimum squared product distance (MSPD) are maximized, and state transitions originated from the same encoder state of a trellis code are then assigned subsets belonging to the same family.

In accordance with the invention, the decoding depth of a multidimensional trellis-coded scheme is minimized by particularly assigning the subsets to the state transitions originated from the same encoder state of a trellis code. Denoting A as the set of encoder states from which the state transitions that originate from those states are assigned subsets of the first family. Similarly, denoting B as the set of encoder states from which the state transitions that originate from those states are assigned subsets of the second family. The subsets are then assigned to the state transitions from each current encoder state to those next states in A so that the inter-subset MTD and inter-subset MSPD between them are maximized. Similarly, the subsets are assigned to the state transitions from each current encoder state to those next states in B so that the inter-subset MTD and inter-subset MSPD between them are maximized.

As a result of these assignments, the number of 2 D signal points, and hence the decoding depth, required by a decoder to realize the X-fold time diversity of the multidimensional trellis code is minimized—with the further benefit that the error-rate performance of the code is improved. The resulting code is more suitable for fading channel applications than many other codes.

DETAILED DESCRIPTION

Figure 1:
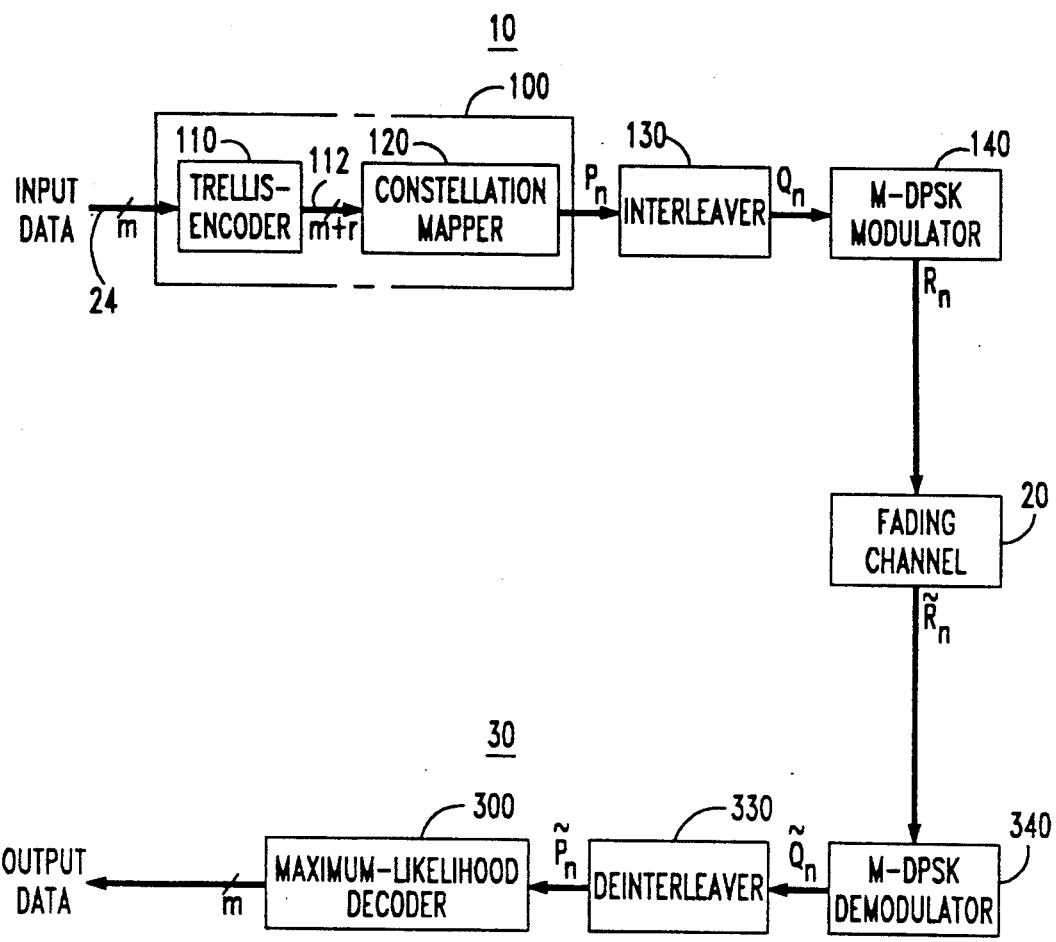
FIG. 1 is a block diagram of a communications system in which the present invention is implemented.

An illustrative communications system as applied to a fading channel, e.g., cellular mobile radio, in which the inventive concept is implemented is shown in FIG. 1.

Figure 2:
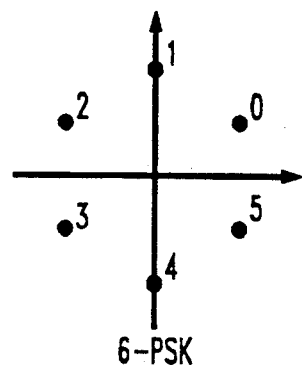
FIGS. 2–3 are illustrative 2 D M-PSK constellations for M equal to 6 and 8 respectively.
Figure 3:
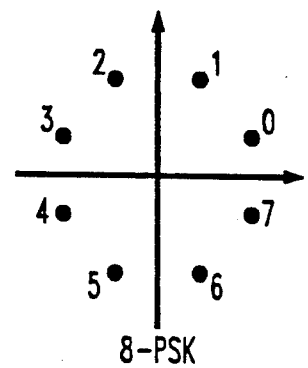

Before describing the inventive concept itself, an overview of the operation of the communications system of FIG. 1 is presented. An average of m input data, or information, bits are applied to trellis-encoder 110, of transmitter 10, every signaling interval T. Trellis-encoder 110 introduces an average number of redundant bits, r, to provide an average of m+r bits at the output of trellis-encoder 110 in each above-mentioned signaling interval. The output of trellis-encoder 110 is mapped by constellation-mapper 120 to a particular 2N-dimensional signal point. The 2N-dimensional signal point is taken from a 2N-dimensional constellation that is usually constructed by concatenating, in the time domain, constituent 2 D constellations, which are typically M-ary phase-shift keying (M-PSK) constellations for fading channel applications. (Some examples of M-PSK constellations are shown in FIGS. 2-3, for M equal to 6 and 8 respectively.) Both trellis-encoder 110 and constellation-mapper 120 are included within coded modulation circuitry 100, which represents a particular trellis-coded modulation scheme. Thus, the output of coded modulation circuitry 100 is a sequence, $P_n$, of 2 D signal points. For example, the sequence $P_n$ may comprise the ordered sequence $P_0, P_1, P_2, P_3, \ldots, P_6, P_7$, where, illustratively, each pair of 2 D signal points ($P_0$, $P_1$), ($P_2, P_3$), ..., or ($P_6, P_7$), forms a four-dimensional (4 D) signal point. Thus, using the 8-PSK constellation of FIG. 3, $P_n$ may be the sequence 0, 0, 0, 4, ..., 1, 3. The sequence of 2 D signal points, $P_n$, at the output of constellation-mapper 120, or alternatively, coded modulation circuitry 100, are then processed by interleaver 130. The 2 D signal points, $Q_n$, at the output of interleaver 130 are differentially encoded by M-ary differential phase-shift keying (M-DPSK) modulator 140. The later allows the use of a differential detection method in the receiver (described below). A differential detection method is preferred because of the fast variation in signal amplitude and carrier phase that can occur in a fading channel. The output of M-DPSK modulator 140 is transmitted over fading channel 20 to receiver 30.

In receiver 30, M-DPSK demodulator 340 and deinterleaver 330 perform the inverse operations of M-DPSK modulator 140 and interleaver 130, respectively. Accordingly, the output of deinterleaver 330 is the received channel-corrupted sequence of 2 D signal points, $\tilde{P}_n$, corresponding to the sequence of 2 D signal points $P_n$ at the input of interleaver 130. The output of deinterleaver 330 is applied to maximum-likelihood decoder 300 (e.g., a Viterbi decoder), which will make a decision as to the most likely value of the transmitted 2 D signal points in order to recover the transmitted data. After receiving the current 2 D signal point, the Viterbi decoder makes a decision as to the 2 D signal point that was received d 2 D signal points ago. This d is referred to as the decoding depth.

As mentioned above, to apply trellis-coded modulation to fading channels, the trellis code should exhibit a so-called "time diversity" property so that the transmitted information may still be recovered in the receiver even in the presence of deep fade. Those in the art have established two design criteria in the design of a trellis code for application to a fading channel. The first design criteria is to maximize the minimum time diversity (MTD), which is built into the code, between any two valid sequences of 2 D signal points. MTD may be defined as follows: let $\{P_n^{(1)}\}$ and $\{P_n^{(2)}\}$ denote two sequences of 2 D signal points at the output of a trellis-coded modulation scheme. Constructing the set A, which contains the positions in the two signal point sequences that differ from each other, MTD is the number of elements in set A. Second, for any two valid sequences with that MTD, the minimum squared product distance (MSPD) between them is maximized. MSPD is defined as:

$$\pi_{i \in A} |P_i^{(1)} - P_i^{(2)}|^2.$$

As used herein, the MTD and MSPD, between valid sequences of 2 D signal points of a trellis-coded modulation scheme, shall be referred to as the "MTD of the code" and the "MSPD of the code." (The "inter-subset MTD", "inter-subset MSPD", "intra-subset MTD" and "intra-subset MSPD" that are discussed below are similarly defined.)

Figure 4:
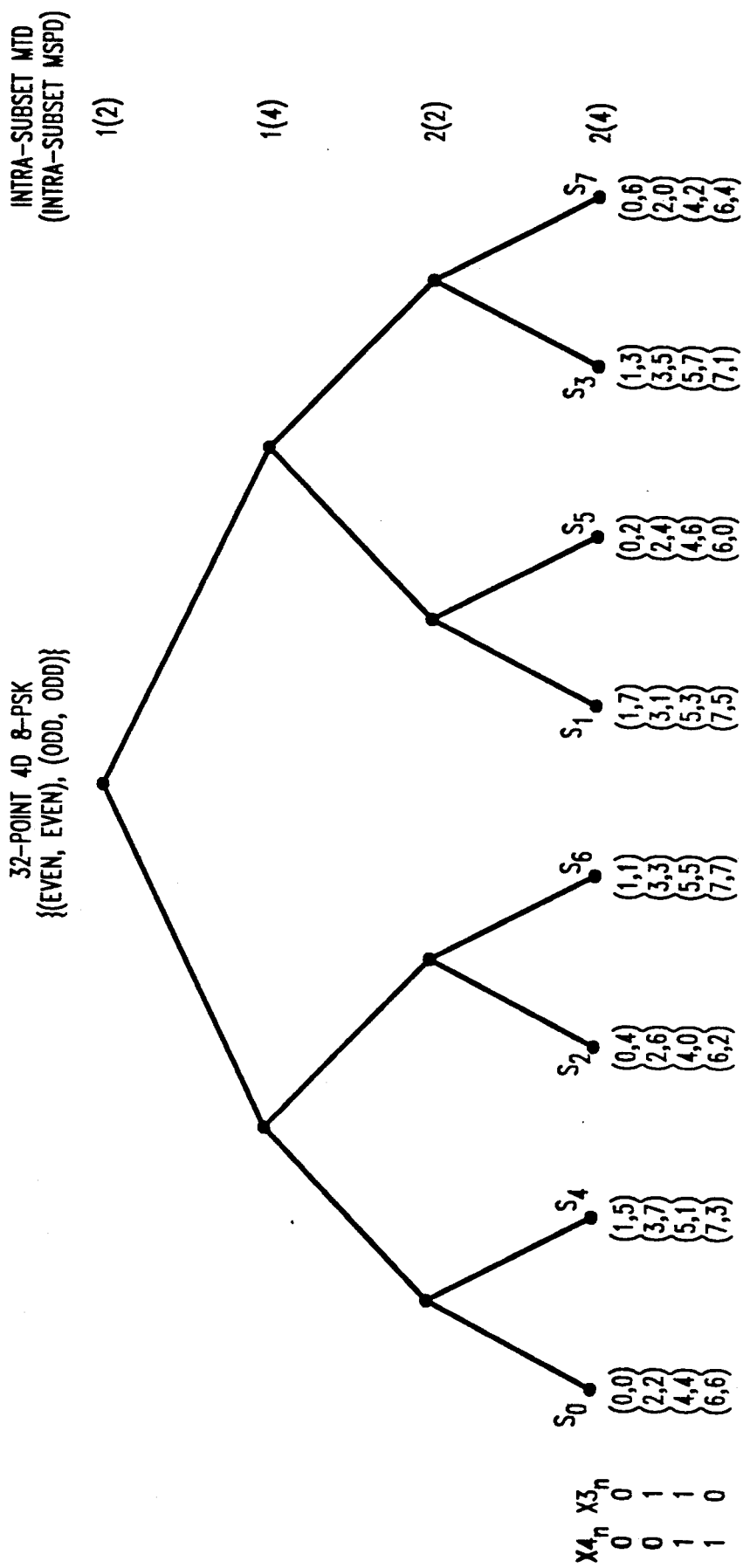
FIGS. 4–6 graphically depict an illustrative 4 D 4-state 8-PSK trellis-coded modulation scheme embodying the principles of the invention.

In accordance with the above-mentioned design criteria, there are two steps in constructing a 2N-dimensional trellis-coded modulation scheme. At this point, reference can be made to FIGS. 4 and 5, which, although being a part of the inventive concept, can be used to illustrate the following construction steps, respectively. The first step is to form and partition a 2N-dimensional constellation, where N is a positive integer. (It should be noted that for N=1, a 2 D trellis-coded scheme is constructed, and for N>1, a multidimensional trellis-coded scheme is constructed.) If the size of the 2N-dimensional constellation is larger than needed, then some of the "less desirable" 2N-dimensional signal points (that is, less desirable in terms of their MTD and MSPD values) are deleted so that the MTD and MSPD between the 2N-dimensional signal points of the resulting 2N-dimensional constellation are maximized. In FIG. 4, the 32 4 D signal points corresponding to {(even, odd) (odd, even)} were deleted. The resulting 2N-dimensional constellation is then partitioned into a chain of increasingly larger numbers of finer subsets. For fading channels, since the design criterion is to maximize the MTD of the code and the MSPD of the code, the partition is to first maximize the "intra-subset MTD", and for any pair of 2N-dimensional signal points in the same subset with that MTD to maximize further the MSPD between them, i.e., the "intra-subset MSPD." This maximization process is performed for each step of the partition chain. Since the MTD of the code and the MSPD of the code to be constructed using the finest subsets obtained from the partition are capped, respectively, by their intra-subset MTD and intra-subset MSPD, the finest subsets should have at least the following properties in order for the code to have built-in time diversity: In the case where N=1, each finest subset consists of only one 2 D signal point. In the remaining cases where N>1, each finest subset should either consist of only one 2N-dimensional signal point, or have an MTD of at least two. The latter is more likely since the size (number of multidimensional signal points) of a multidimensional constellation is typically large.

The second step in constructing a 2N-dimensional trellis-coded modulation scheme is to select a trellis diagram and assign to each state transition (branch) a finest subset obtained from the above partition. For fading channels, the assignment of subset should be done to maximize, first, the MTD of the code, and second, the MSPD of the code.

To effectively use the time-diversity property of the trellis code to cope with deep fade, which tends to be bursty, interleaver 130 (described above) is used to further separate the time intervals in which the signal points that contribute to the diversity of the trellis code are transmitted. However, the amount of separation that a given interleaver can achieve is limited by both the interleaver length and the decoding depth of the trellis code. As known in the art, a multidimensional trellis code typically has a larger decoding depth, and, consequently, poorer error-rate performance than a 2D trellis code. As a result, the 2D trellis code is preferred in fading channel applications.

In consideration of the above, it would be advantageous to minimize the decoding depth, and, hence, improve the error-rate performance, of a multidimensional trellis code with X-fold time diversity for application to a fading channel. In accordance with the invention, an illustrative 4D 4-state trellis-coded 8-PSK scheme, in which the decoding depth is minimized, is graphically depicted in FIGS. 4–6. In accordance with the inventive concept, FIG. 4 shows how a 32-point 4D 8-PSK constellation is partitioned into a chain of increasingly larger numbers of finer subsets using the partition rules for fading channels described above. Illustratively, the 2D 8-PSK constellation of FIG. 3 is used. The 4D constellation is formed by first concatenating a pair of 2D 8-PSK constellations in the time domain and then deleting those 4D points (each 4D point is represented as a pair of 2D points) that consists of an even-numbered 2D point and an odd-numbered 2D point. For easy discussion, we shall refer to the two subsets obtained after the first step of the partition as families (these are the subsets with an intra-subset MTD of one and intra-subset MSPD of 4 in FIG. 4, assuming that the amplitude of each 2D point is normalized to one). The intra-subset MTD of each finest subset $S_i$ in FIG. 4 is 2 with an intra-subset MSPD of 4.

Figure 5:
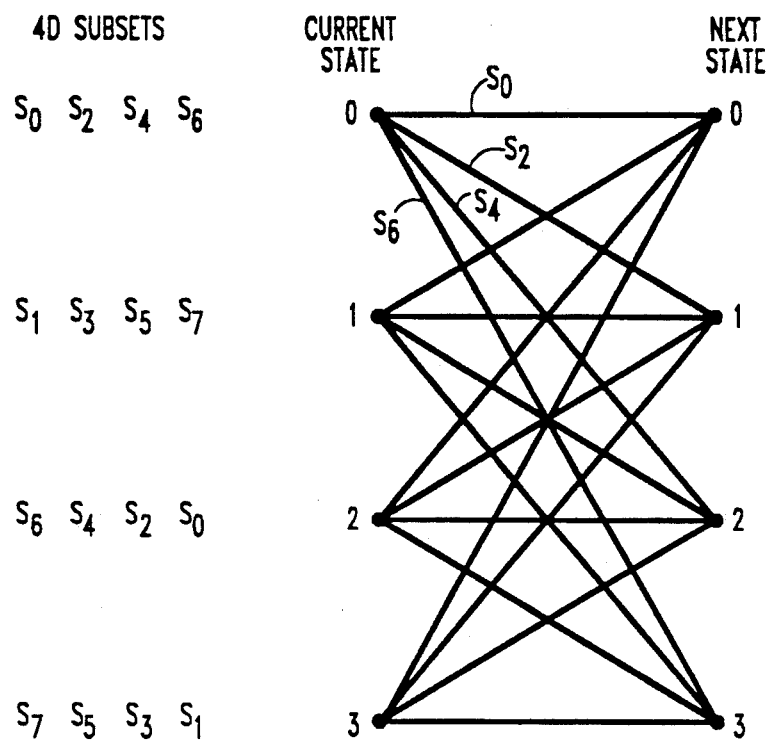

FIG. 5 shows a fully-connected 4-state trellis diagram of trellis encoder 110 of FIG. 1, each state transition of the diagram is assigned a 4D subset $S_i$ using the following general code design rules:

1) The state transitions originated from the even-numbered current states are assigned subsets $S_i$ belonging to the same first family.
2) The state transitions originated from the odd-numbered current states are assigned subsets $S_i$ belonging to the same second family.
3) Whenever possible, the state transitions merged into each given next state are assigned subsets $S_i$ belonging to the same family (this rule does not apply to the present illustrative code since its trellis diagram is fully connected as is shown in FIG. 5).

In addition, and in accordance with the invention, in order to reduce the decoding depth of the code:

4) The state transitions originated from each given current state and going to the even-numbered states are assigned subsets $S_i$ whose "inter-subset MTD" and "inter-subset MSPD" are maximized; and similarly for the state transitions originated from each given current state and going to the odd-numbered next states.

From FIG. 5 it can be determined that the inter-subset MTD and intersubset MSPD using the fourth rule above are maximized to be both 2.

As used herein there are three minimum decoding depths (MDD) that are used to characterize a code. Let $d_1+1$ be the length (measured in number of 2D signal points) of the longest valid sequence of 2D signal points that is originated from the same initial state as a given valid sequence of 2D signal points and merged into the same last state as the given sequence, whose amount of time diversity from the given sequence is the same as the MTD of the code. To make maximum use of the MTD-fold, or X-fold, time diversity of the code, the transmitting interval of each sequence of $d_1+1$ successive 2D signal points of the code should be separated by the interleaver as far as possible.

Let $d_2$ be the length of the longest unmerged valid sequence of 2D signal points that is originated from the same initial state as a given valid sequence of 2D signal points, whose amount of time diversity from the given sequence is less than the MTD of the code. The number, $d_2+1$, represents the minimum number of 2D signal points that must be received by the decoder to realize the MTD-fold time diversity of the trellis code. In addition, the transmitting interval of each sequence of $d_2+1$ successive 2D signal points of the code should be separated by the interleaver as far as possible.

Let $d_3$ be the length of the longest unmerged valid sequence, B, of 2D signal points that is originated from the same initial state as a given valid sequence, C, of 2D signal points that has the following properties: The amount of time diversity between sequence B and C is not greater than the MTD of the code; and in the case where the amount of time diversity between the two sequences is the same as the MTD of the code, the squared product distance between the two sequences is less than the MSPD of the code. The number, $d_3+1$, represents that number of 2D signal points which must be received by the decoder to realize all of the coding gain of the trellis code. The transmitting interval of each sequence of $d_3+1$ successive 2D signal points of the code should be separated by the interleaver as far as possible.

We shall hereinafter refer to the lengths $d_1$, $d_2$, and $d_3$, as the MDD1, MDD2, and MDD3 of the code respectively.

Figure 6:
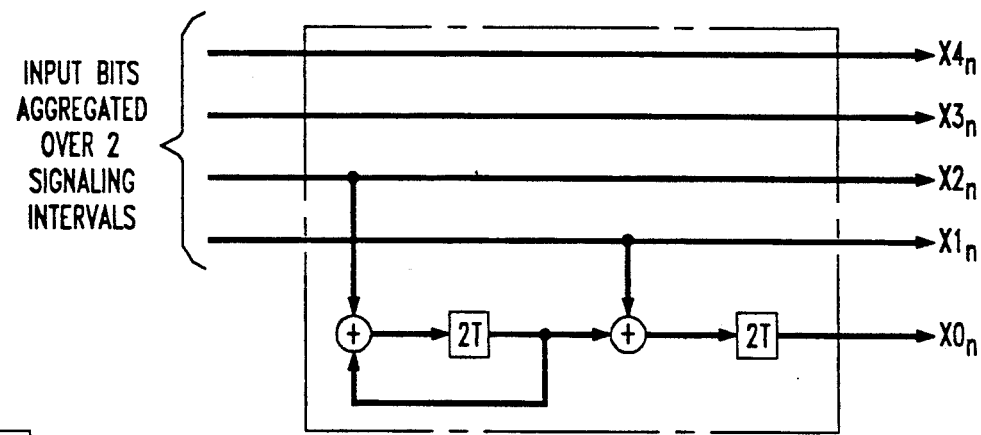

The trellis diagram of FIG. 5 may be alternatively represented by the logic diagram of trellis encoder 110 shown in FIG. 6. In FIG. 6, two out of the four input bits, aggregated over two signaling intervals, enter a rate-$\frac{2}{3}$ 4-state trellis encoder. The three encoded output bits $X2_n$, $X1_n$, and $X0_n$, are next used to select a 4D subset $S_i$, where i is the decimal equivalent of the bit pattern $X2_n X1_n X0_n$. The two remaining uncoded input bits $X4_n$ and $X3_n$ are then used to select a 4D signal ($P_n$, $P_{n+1}$), from the earlier selected subset $S_i$. To reduce the bit error rate (BER), Gray coding is used in this latter selection, as shown in FIG. 4.

The MTD, MSPD, MDD1, MDD2, and MDD3 of the 4D rate-$\frac{4}{5}$ 4-state trellis-coded 8-PSK can be determined to be 2, 4, 1, 3, and 5, respectively. The MTD and MSPD of the code are the same as the intra-subset MTD and MSPD of subsets $S_i$, and hence are maximized for the given partition. The small MDD's of this multidimensional code, make it compete favorably with 2D trellis-coded modulation schemes. In constructing this code using the 8-subset partition of FIG. 4, it should be noted that its minimum squared Euclidean distance (MSED), which is equal to 3.17, is also maximized. Although less important for fading channels, this maximization of the MSED is cost-free in actual implementations.

Further, it should also be noted that proper design of the interleaver can take additional advantage of the various MDD's of the above-mentioned trellis code. As disclosed in U.S. Pat. No. 5,056,112 issued Oct. 8, 1991 to L.-F. Wei, an interleaver can be designed that is "matched to the code," with the result that the "effective interleaving length" is greater than the "actual interleaving length" of the interleaver.

Figure 7:
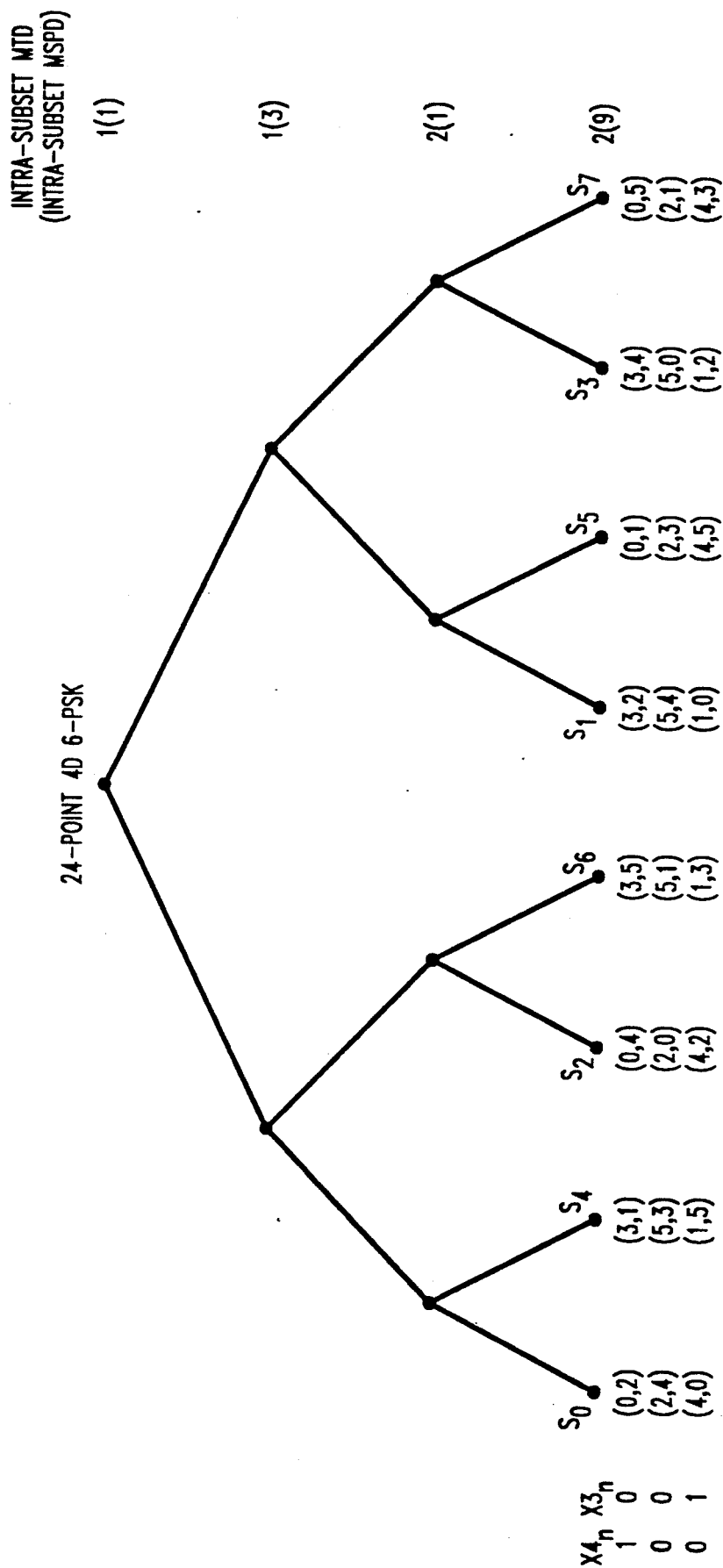
FIGS. 7–8 graphically depict an illustrative 4 D 4-state 6-PSK trellis-coded modulation scheme embodying the principles of the invention.
Figures 8, 9:
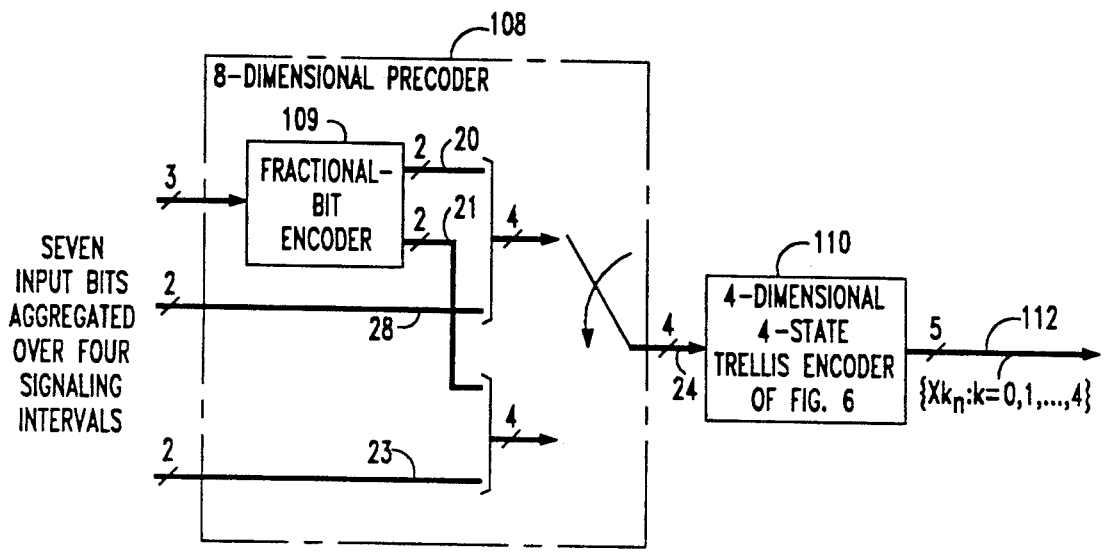
FIG. 9 is a truth table defining the operation of the fractional bit encoder shown in FIG. 8.

Another illustrative trellis-coding scheme, embodying the principles of the invention, is shown in FIGS. 7-9. A 24-point 4D 6-PSK constellation is formed by concatenating a pair of 2D 6-PSK constellations. The constellation is partitioned into 8 subsets as shown in FIG. 7, where each subset consists of three pairs of 2D signal points. Since each 4D subset has only 3 pairs of 2D signal points, 8-dimensional (8D) precoder 108 is used to process the input data bits, as is shown in FIG. 8. In FIG. 8, the input bit stream comprises 7 input bits, which are aggregated over four signaling intervals and converted into two pairs of bits through fractional bit encoder 109. (The later is referred to as a fractional bit encoder because it divides an odd number of input bits into an even number of output groups.) Fractional bit encoder 109 operates in accordance with the table shown in FIG. 9. From FIG. 9, it can be seen that each output bit pair on leads 20 and 21 can only assume three bit patterns and is alternately applied every two signaling intervals, via bit pair $X4_nX3_n$, to trellis encoder 110, which is shown in FIG. 6. Consequently, each bit pair, $X4_nX3_n$, can assume only three bit patterns, 00, 01, and 10, and is used to select a signal point from a 4D subset identified by the trellis code, as shown in FIGS. 7 and 8. This trellis code has a bandwidth efficiency of 1.75 bits/symbol based on this partition. The MTD and MSPD of this code can be determined to be 2 and 9, respectively. The MDD1, MDD2, and MDD3 of this code are 2, 3, and 7, respectively.

The foregoing merely illustrates the principles of the invention and it will thus be appreciated that those skilled in the art will be able to devise various alternative arrangements, which, although not explicitly described herein, embody the principles of the invention and are within its spirit and scope. For example, although the invention is illustrated herein as being implemented with discrete functional building blocks, e.g., trellis encoders, constellation mappers, etc., the functions of any one or more of those building blocks can be carried out using one or more appropriate programmed processors.

I claim

1. A method comprising
   receiving a stream of input data comprising an average of m data bits every T signaling interval, where m>0 and T>0,
   using a trellis-encoder to encode the stream of input data into one of a plurality of sequences of 2N-dimensional signal points, where N>1, said 2N-dimensional signal points being taken from a 2N-dimensional constellation, said trellis-encoder having an X-fold time diversity, where X>1, and
   transmitting the sequence of 2N-dimensional signal points,
   said constellation comprising a first and a second family, each family comprising a number of subsets, each subset comprising at least one 2N-dimensional signal point,
   said trellis-encoder comprising a number of states, each state having a plurality of state transitions, said plurality of state transitions being assigned subsets of the same family, where those states with state transitions assigned subsets of the first family are included in a first set and those states with state transitions assigned subsets of the second family are included in a second set, and where those state transitions between a present state and a plurality of next states, said next states being in the same set of states, are assigned subsets which maximize the minimum time diversity between those subsets.

2. The method of claim 1 wherein the assignment of subsets to state transitions from the present state to the plurality of next states of the same set further maximizes the minimum square product distance.

3. The method of claim 1 further comprising the step of interleaving the sequence of 2N-dimensional signal points before the transmitting step.

4. The method of claim 1 wherein the step of using the trellis encoder includes the steps of
   providing a stream of output data comprising an average of m+r data bits every T signaling interval, where r>0, and
   mapping the stream of output data in each group of N signaling intervals to one of the 2N-dimensional signal points from said constellation.

5. The method of claim 1 wherein the intra-subset minimum time diversity and intra-subset minimum square product distance in each of said family is maximized.

6. The method of claim 1 wherein said trellis-encoder is a 4 state trellis code, and said 2N-dimensional constellation is a 4D constellation.

7. The method of claim 6 wherein said method has a first minimum decoding depth (MDD1) equal to 1, a second minimum decoding depth (MDD2) equal to 3, a third minimum decoding depth (MDD3) equal to 5 and a minimum time diversity equal to 2.

8. The method of claim 6 wherein said 4D constellation comprises a 2D 8-PSK constellation.

9. The method of claim 6 wherein said 4D constellation comprises a 2D 6-PSK constellation.

10. Apparatus comprising
    means for receiving a stream of input data comprising an average of m data bits every T signaling interval, where m>0 and T>0,
    means for trellis-encoding the stream of input data into one of a plurality of sequences of 2N-dimensional signal points, where N>1, said 2N-dimensional signal points being taken from a 2N-dimensional constellation, said means for trellis-encoding having an X-fold time diversity, where X>1, and
    means for transmitting the sequence of 2N-dimensional signal points,
    said constellation comprising a first and a second family, each family comprising a number of subsets, each subset comprising at least one 2N-dimensional signal point,
    said means for trellis-encoding comprising a number of states, each state having a plurality of state transitions, said plurality of state transitions being assigned subsets of the same family, where those states with state transitions assigned subsets of the first family are included in a first set and those states with state transitions assigned subsets of the second family are included in a second set, and where those state transitions between a present state and a plurality of next states, said next states being in the same set of states, are assigned subsets which maximize the minimum time diversity between those subsets.

11. The apparatus of claim 10 wherein the assignment of subsets to state transitions from the present state to the plurality of next states of the same set further maximizes the minimum square product distance.

12. The apparatus of claim 10 further comprising a means for interleaving the sequence of 2N-dimensional signal points before input to the means for transmitting.

13. The apparatus of claim 10 wherein the means for trellis-encoding includes means for providing a stream of output data comprising an average of m+r data bits every T signaling interval, where r>0, and means for mapping the stream of output data in each group of N signaling intervals to one of the 2N-dimensional signal points from said constellation.

14. The apparatus of claim 10 wherein the intra-subset minimum time diversity and intra-subset minimum square product distance in each of said family is maximized.

15. The apparatus of claim 10 wherein said means for trellis-encoding uses a 4 state trellis code, and said 2N-dimensional constellation is a 4D constellation.

16. The apparatus of claim 15 wherein said apparatus has a first minimum decoding depth (MDD1) equal to 1, a second minimum decoding depth (MDD2) equal to 3, an a third minimum decoding depth (MDD3) equal to 5, and a minimum time diversity equal to 2.

17. The apparatus of claim 15 wherein said 4D constellation comprises a 2D 8-PSK constellation.

18. The apparatus of claim 15 wherein said 4D constellation comprises a 2D 6-PSK constellation.

* * * * *